United States Patent
Kushul et al.

(10) Patent No.: US 7,425,270 B2
(45) Date of Patent: Sep. 16, 2008

(54) METHOD FOR EXTRACTING PERCHLORATE-ION FROM AN AQUEOUS SOLUTION

(75) Inventors: Andrey Veniaminovich Kushul, Admiralteiskaya nab., 10-28, St. Petersburg (RU) 190000; Igor Mikhaylovich Belozerov, Novosibirsk (RU); Vitaly Petrovich Isupov, Novosibirsk (RU); Svyatoslav Vyacheslavovich Polovtsev, St. Petersburg (RU); Oleg Andreevich Skresanov, Novosibirsk (RU)

(73) Assignee: Andrey Veniaminovich Kushul, St. Petersburg (RU)

( * ) Notice: Subject to any disclaimer, the term of this patent is extended or adjusted under 35 U.S.C. 154(b) by 90 days.

(21) Appl. No.: 11/617,564

(22) Filed: Dec. 28, 2006

(65) Prior Publication Data

US 2007/0102365 A1    May 10, 2007

Related U.S. Application Data

(63) Continuation of application No. PCT/RU2005/000364, filed on Jun. 23, 2005.

(30) Foreign Application Priority Data

Jul. 1, 2004    (RU) .............................. 2004121071

(51) Int. Cl.
B01J 49/00    (2006.01)
(52) U.S. Cl. ....................................... 210/670; 210/683
(58) Field of Classification Search ................. 210/670, 210/683
See application file for complete search history.

(56) References Cited

U.S. PATENT DOCUMENTS

| 6,066,257 | A  | * | 5/2000 | Venkatesh et al. ........... 210/615 |
| 6,407,143 | B1 |   | 6/2002 | Even et al. |
| 6,448,299 | B1 |   | 9/2002 | Brown et al. |
| 2006/0011550 | A1 | * | 1/2006 | Bourke et al. ................ 210/670 |

FOREIGN PATENT DOCUMENTS

| SU | 1074589 A  | 2/1984 |
| SU | 1666450 A1 | 7/1991 |

OTHER PUBLICATIONS

Batista, J. R. et al., "The Removal of Perchlorate From Waters Using Ion-Exchange Resins," Chapter 13, Perchlorate In the Environment, edited by Urbansky, Kluwer Academic/Plenum Publishers, New York, pp. 135-145.

English translation of International Search Report from PCT/RU2005/000364, filed on Jul. 1, 2004.

* cited by examiner

*Primary Examiner*—Chester T. Barry
(74) *Attorney, Agent, or Firm*—Houston Eliseeva LLP

(57) ABSTRACT

The invention relates to chemical industry and can be used for extracting perchlorate-ion from a highly concentrated processing solution having a complex nitrate-chloride-sulphate-iodate composition. The inventive method for extracting perchlorate-ion from an aqueous solution comprises passing the solution through a highly basic anionite and subsequent regeneration of the said anionite in a metal salt aqueous solution. The anionite in the nitrate form is used as an anionite, and its regeneration is performed in an aqueous solution of alkali or alkali-earth metal nitrate at the temperature of 0-60° C.

9 Claims, No Drawings

METHOD FOR EXTRACTING PERCHLORATE-ION FROM AN AQUEOUS SOLUTION

RELATED APPLICATIONS

This application is a Continuation of PCT application serial number PCT/RU2005/000364 filed on Jun. 23, 2005 which in turn claims priority to Russian application serial number 2004121071 filed on Jul. 1, 2004, both of which are incorporated herein by reference in their entirety.

FIELD OF THE INVENTION

The invention relates to chemical industry, and in particular to extracting perchlorate-ion from highly concentrated processing solution having a complex nitrate-chloride-sulphate-iodate composition.

BACKGROUND OF THE INVENTION

At present application of industrially prepared strongly basic anion-exchange resins on the polystyrene and polyacrilic basis is known in treatment (purification) technologies of natural ground and surface waters from perchlorate-ion impurities.

So, the method is known for extracting perchlorate-ion from aqueous solution (see Batista J. R. et al.—The removal of perchlorate from waters using ion-exchange resins.—"Perchlorate in the Environment".—N.Y., 2000, p.p. 135-145) by passing it through a standard industrial highly basic anionite in the form of chloride produced by firms Sybron Chemicals and Purolite and further resin regeneration in an aqueous solution of sodium chloride.

The disadvantage of the known method is its low selectivity of extracting perchlorate-ion from highly concentrated solution of complex salt composition.

The method for extracting perchlorate-ion from an aqueous solution is known (see U.S. Pat. No. 6,407,143, Int. Cl. C08J 005/20, published 18 Jun. 2002), comprising passing a solution through a highly basic anionite in the form of a chloride and its subsequent regeneration in a composition including liquid overcritical carbon dioxide and surface active component containing quaternary ammonium chloride surfactants.

The known method is difficult to implement and, besides, it has insufficient efficiency of extracting perchlorate-ion from a highly concentrated solution of a complex salt composition.

The method for extracting perchlorate-ion from an aqueous solution is known (see U.S. Pat. No. 6,448,299, Int. C. B01J 49/00, published 10 Sep. 2002), comprising passing the solution through a specially produced (made) highly basic anionite in the chloride form and its subsequent regeneration by the mixture of $FeCl_3$ and $HCl$ in an aqueous-alcoholic solution.

The known method requires application of complex and costly technology for resin regeneration that limits the field of its application.

The closest in technical concept and essential features to the claimed invention is a method for extracting perchlorate-ion from an aqueous solution (see U.S. Pat. No. 6,066,257, Int. Cl. C01F 1/58, published 23 May 2000), comprising passing the solution through a highly basic anionite in the chloride ($Cl-$) form and its subsequent regeneration by alkali metal salts, mainly, sodium chloride (NaCl).

The known method-prototype demonstrated insufficient efficiency for extracting perchlorate-ion from a highly concentrated solution of a complex salt composition.

SUMMARY OF THE INVENTION

An object of the invention was to create such method for extracting perchlorate-ion from an aqueous solution which would allow with high degree of efficiency to extract perchlorate-ion from a highly concentrated solution of complex salt composition.

The stated object is solved by providing a method for extracting perchlorate-ion from an aqueous solution, comprising passing the solution through a highly basic anionite and subsequent regeneration of the said anionite in the aqueous solution of a metal salt, the anionite in the nitrate form is used as an anionite, and its regeneration is performed in the aqueous solution of alkali or alkali-earth metal nitrate at the temperature of 0-60° C.

The regenerated anionite can be washed with water and used again (reused) for extracting perchlorate-ion.

In the absence of industrially prepared anionite in the nitrate form it can be obtained by keeping a highly basic anionite in the chloride form or a highly basic anionite in the basic ($OH-$) form in an aqueous solution of the nitrate of an alkali metal.

Potassium nitrate or sodium nitrate is mainly used as an alkali metal nitrate.

It is also advisable to use magnesium nitrate as an alkali metal nitrate.

Regeneration of the anionite in the nitrate form is performed mainly at the temperature of 0-45° C.

Regeneration of the anionite in the nitrate form is performed in the said aqueous nitrate solution of alkali or alkali-earth metal with the concentration from 1 mass. % to the saturation concentration at the regeneration temperature.

Carrying out anionite regeneration at the temperature below 0° C. results in the rate reduction (slow-down) of sorption and regeneration processes and subsequent freezing of the water solution of the alkali or alkali-earth metal nitrate. Carrying out the anionite regeneration at the temperature above 60° C. negatively affects its sorption properties.

The applicant did not find a description of the method for extracting perchlorate-ion from an aqueous solution in patent or other scientific and technical literature, which comprises a set of essential features of the claimed method. In the opinion of the applicant, it is the evidence of novelty of the claimed invention.

The studied information sources had not considered the issue of the effect of the form of the highly basic anionite exchange resin (chloride, basic or any other one) on the value of perchlorate-ions sorption and the degree of resin regeneration. Industrially prepared or specially designed grades of resins in $Cl-$ or $OH-$ form are used in all methods known to the applicant.

The inventors for the first time obtained the data on significantly more efficient use of highly basic resin in nitrate ($NO_3-$) form for perchlorate-ions sorption in comparison with the traditional chloride form. This effect is achieved by a combination of resin application in $NO_3-$ form and application of aqueous solutions of alkali or alkali-earth metals nitrates as regenerating solutions.

The comparison performed by the inventors of the claimed method with the known ones using the strongly basic anionites in $Cl-$ form and regeneration by the solution of sodium chloride (NaCl), under the same conditions showed that at close magnitudes of the perchlorate-ion sorption the value of the desorption level determining the efficiency of the whole technology according to the claimed method, is several times higher. When using the known method-prototype, the regeneration degree does not exceed 20% even at a higher temperature (40° C.) and regeneration by the concentrated (30%) NaCl solution, whereas already at the temperature of 20° C. regeneration of strongly basic anionite in $NO_3$— form by $NaNO_3$ solution reaches 50%, $Mg(NO_3)_2$— about 60%, and regeneration by $KNO_3$ solutions in the temperature interval from 0 to 40° C. reaches 100%.

Thus, application of strongly basic anionite in the nitrate form in the claimed method and realization of its regeneration in the aqueous solution of alkali or alkali-earth metal nitrate at the temperature of 0-60° C. provides efficiency improvement of sorption perchlorate-ion extracting from the highly concentrated solution of complex salt composition, that, in the opinion of the applicant, allows to consider the claimed engineering solution as a one satisfying the criterion of the "inventive step".

The claimed method for extracting perchlorate-ion from the aqueous solution is explained by the tables, where:

In table 1 comparative measurement results of the dynamic exchange capacity of strongly basic anionites in Cl— and $NO_3$— forms are shown;

In table 2 comparative measurement results of perchlorate-ion desorption degree by the known method-prototype and the claimed method (the amount of anionite used was equivalent to 5 g of dry resin) are given;

In table 3 comparative measurement results of perchlorate-ion desorption degree by the known method according to the U.S. Pat. (No. 6,448,299, Int. Cl. B01J 49/00, published 10 Sep. 2002) and the claimed method (the amount of anionite used was equal to 5 g of dry resin) are shown;

In table 4 the research results of several sorption-desorption cycles of perchlorate-ion by the claimed method are given.

DETAILED DESCRIPTION OF THE PREFERRED EMBODIMENTS

The claimed method is performed as follows. A highly concentrated solution of a complex salt composition, containing perchlorate-ion, is passed through a column, filled with highly basic anionite in the nitrate form. The highly basic anionite in the nitrate form can be obtained from industrial gel anionites (AB-17, Purolite A-400 and the like), converted from the initial chloride form to the nitrate form. After extracting perchlorate-ion from the solution anionite regeneration from perchlorate-ion is performed by the solution of an alkali or alkali-earth metal nitrate at the temperature of 0° C. to 60° C. Further sorption-desorption cycles are repeated.

The examples of the embodiments of the claimed method for extracting perchlorate-ion from aqueous solutions are given below. The claimed method was tested on highly concentrated aqueous salt solutions, the composition of which is given below:

| Ions, | Content, g/l |
|---|---|
| $SO_4^{2-}$ | 40; |
| $NO_3^-$ | 290; |
| $Cl^-$ | 120; |
| $JO_3^-$ | 1; |
| $ClO_4^-$ | 4; |
| $Na^+$ | 146; |

-continued

| Ions, | Content, g/l |
|---|---|
| $K^+$ | 25; |
| $Mg^{2+}$ | 25. |

Because of the absence of industrially prepared highly basic anionites in nitrate ($NO_3^-$) form, anionites AB-17 and Purolite A-400 in the chloride form, produced by the industry, were converted into the nitrate form. For this purpose 110 g of the initial anionite A-400 and 100 g of the initial anionie AB-17 were filled with 400 ml of water, where 50 g of pure sodium nitrate had been preliminary dissolved. After standing for 24 hours the solutions were poured out, anionites were filtered, washed by water and dried in the air. The anionites by the described method were used in subsequent experiments as anionites in the nitrate form.

The content of perchlorate-ion in the solutions was determined by two independent analytical methods: NMR spectroscopy and with the help of perchlorate-selective electrode.

INDUSTRIAL APPLICABILITY

Example 1

A portion of anionite AB-17 in the nitrate form in the amount of 5 g was placed in the experimental column and a processing solution of the above-mentioned composition in the amount of 400 ml at the temperature of 20° C. was passed through it. The content of perchlorate-ion was determined in the probes collected in the process of extracting, which (in recalculating to $KClO_4$) was 1.003 g, and the capacity of air-dry anionite AB-17 in the nitrate form was 1.40 millimole/g. The experimental results are given in table 1 (line 2). Further perchlorate-ion free 18% solution of potassium nitrate in the amount of 200 ml at the flow rate of 0.7 ml/min was passed through 5 g of anionite AB-17, saturated by perchlorate-ion. The content of perchlorate-ion and degree of its extracting, which was 95% (see table 2, line 3) were determined in the probes collected during the regeneration process.

Example 2

Perchlorate-ion sorption was determined as in the example 1, but desorption was performed by 10% solution of potassium nitrate in the amount of 300 ml at the flow rate of 1.0 ml/min. The experimental results are given in table 2 (line 4).

Example 3

Perchlorate-ion sorption was determined as in the example 1, but desorption was performed by 24% solution of potassium nitrate in the amount of 200 ml at the flow rate of 1.0 ml/min. The experimental results are given in table 2 (line 5).

Example 4

A portion of anionite Purolite A-400 in the nitrate form in the amount of 5 g was placed in the experimental column and the processing solution of the above-mentioned composition in the amount of 400 ml at the temperature of 20° C. was passed through it. The perchlorate-ion content was determined in the probes collected in the process of extracting. The experimental results are given in table 1, line 4. Further, perchlorate-ion free 10% solution of potassium nitrate in the amount of 300 ml was passed through 5 g of anionite Purolite A-400 saturated with perchlorate-ion. Perchlorate-ion content and degree of its extracting, which was 79% (see table 2, line 6), were determined in the probes collected in the process of regeneration.

Example 5

Sorption and desorption of perchlorate-ion was determined as in the example 4, but at the temperature of 40° C. The results are given in table 1, line 5 and in table 2, line 6.

Example 6

Sorption and desorption of perchlorate-ion was determined as in the example 4, but sorption was performed at the temperature of 60° C., and desorption—at the temperature of 3° C. The results are given in table 1, line 6 and in table 2, line 6.

Example 7

Sorption of perchlorate-ion was determined at the temperature of 1° C., and desorption was performed by 14% solution of $KNO_3$ at the temperature of 3° C. The results are given in table 1, line 7 and in table 2, line 7.

Examples 8 and 9

Sorption of perchlorate-ion was determined at the temperature of 20° C., and desorption was performed by 24% solution of $KNO_3$ at the temperature of 20° C. and 40° C. The results are given in table 1, line 4 and in table 2, line 8.

Example 10

Sorption of perchlorate-ion was determined as in the example 1, but desorption was performed by 16% solution of potassium nitrate in the amount of 100 ml at the flow rate of 2.5 ml/min. The experimental results are given in table 2, line 9.

TABLE 1

| Anionite grade | Conditions for determining of dynamic exchange capacity (DEC) of anionite | | DEC, millimole $KClO_4$/g of dry anionite |
|---|---|---|---|
| | Solution flow rate, ml/min | Temperature, ° C. | |
| AB-17 in $Cl^-$ form | 2.5 | 20 | 1.26 |
| AB-17 in $NO_3^-$ form | 2.5 | 20 | 1.40 |
| Purolite A-400 в $Cl^-$ форме | 2.0 | 20 | 1.24 |
| Purolite A-400 in $NO_3^-$ form | 2.0 | 20 | 1.40 |
| Purolite A-400 in $NO_3^-$ form | 2.0 | 40 | 1.31 |
| Purolite A-400 in $NO_3^-$ form | 2.0 | 60 | 1.29 |
| Purolite A-400 in $NO_3^-$ form | 2.0 | 1 | 1.37 |

TABLE 2

| | | Desorption degree, % | Flow rate at decorption, ml/min |
|---|---|---|---|
| AB-17 in $Cl^-$ form, solution of NaCl 12%, column effluent volume 150 ml | 20° C. | 10 | 1.5 |
| | 40° C. | 13 | 1.0 |
| Purolite A-400 in $Cl^-$ form, solution of NaCl 30%, column effluent volume 150 ml | 40° C. | 18 | 1.5 |
| AB-17 in $NO_3^-$ form, column effluent volume 200 ml, solution of 18% $KNO_3$ | 20° C. | 95 | 0.7 |
| AB-17 in $NO_3^-$ form, column effluent volume 300 ml, solution of 10% $KNO_3$ | 20° C. | 85 | 1.0 |
| AB-17 in $NO_3^-$ form, column effluent volume 200 ml, solution of 24% $KNO_3$ | 20° C. | 95 | 1.0 |
| Purolite A400 in $NO_3^-$ form, column effluent volume 300 ml, solution of 10% $KNO_3$ | 20° C. | 79 | 1.0 |
| | 40° C. | 100 | 1.0 |
| | 3° C. | 70 | 2.0 |
| Purolite A-400 in $NO_3^-$ form, column effluent volume 300 ml, solution of 14% $KNO_3$ | 3° C. | 84 | 1.0 |
| Purolite A-400 in $NO_3^-$ form, column effluent volume 300 ml, solution of 24% $KNO_3$ | 20° C. | 88 | 1.0 |
| | 40° C. | 98 | 1.0 |
| AB-17 in $NO_3^-$ form, column effluent volume 100 ml, solution of 16% $NaNO_3$ | 20 | 46 | 2.5 |
| AB-17 in $NO_3^-$ form, column effluent volume 200 ml, solution of 3.3 M $Mg(NO_3)_2$ | 20 | 57 | 0.8 |

Example 11

Sorption of perchlorate-ion was determined as in the example 1, but desorption was performed by the magnesium nitrate solution with molarity of 3.3 in the amount of 200 ml at the flow rate of 0.8 ml/min. The experimental results are given in table 2, line 10.

Example 12 and 13

For comparison sorption of perchlorate-ion on anionites AB-17 and Purolite A-400 in chloride form and desorption by the sodium chloride solution were performed according to the method-prototype. The results are given in table 1, lines 1 and 3 and in table 2, lines 1 and 2. As it is seen from the given data, the claimed method has higher efficiency of sorption perchlorate-ion extracting from the highly concentrated solution of complex salt composition and incomparably greater depth of perchlorate-ion extracting from the anionite.

The comparison was also performed of the desorption efficiency according to the claimed method and the known one, described in the U.S. Pat. No. 6,448,299, wherein desorption of perchlorate-ion by chloride iron is performed in aqueous-alcoholic muriatic solution from resin in the chloride form. The results of comparative tests, given in table 3, show much higher degree of desorption under the claimed method.

In order to estimate the reuse possibility of highly basic anionite in the nitrate form the study was performed of several sorption-desorption cycles of perchlorate-ion on the anionite AB-17 in the nitrate form by 15% solutions of $KNO_3$ at 20° C. and on the anionite Purolite A-400 in the nitrate form by 25% solutions of $KNO_3$ at the temperature of 40° C. The study results are given in table 4. The obtained data testify advisability of anionite reuse without noticeable deterioration of the claimed method efficiency.

TABLE 3

| Anionite and column effluent | Temperature, °C. | Desorption degree, % | Flow rate at desorption, ml/min |
|---|---|---|---|
| Solution of $FeCl_3$ + HCl + ethanol 35%, column effluent volume 200 ml, 10 g of dry resin AB-17 in $Cl^-$ form | 20<br>40 | 28<br>24<br>22 | 2.5<br>0.8<br>2.0 |
| AB-17 in $NO_3^-$ form, column effluent volume 200 ml, solution of 18% $KNO_3$ | 20 | 95 | 0.7 |
| AB-17 in $NO_3^-$ form, column effluent volume 300 ml, solution of 10% $KNO_3$ | 20 | 85 | 1.0 |
| AB-17 in $NO_3^-$ form, column effluent volume 200 ml, solution of 24% $KNO_3$ | 20 | 95 | 1.0 |
| Purolite A-400 in $NO_3^-$ form, column effluent volume 300 ml, solution of 10% $KNO_3$ | 20<br>40 | 79<br>100 | 1.0<br>1.0 |
| Purolite A-400 in $NO_3^-$ form, column effluent volume 300 ml, solution of 24% $KNO_3$ | 20<br>40 | 88<br>98 | 1.0<br>1.2 |

TABLE 4

| Process parameters | Cycle number | | |
|---|---|---|---|
| | 1 | 2 | 3 |
| Anionite AB-17, 20° C.: | | | |
| Anionite capacity (mmole $KClO_4/g$) at sorption (rate 2 ml/min) | 0.97 | 0.97 | 1.07 |
| Desorption degree (%) at the rate of 1 ml/min, Column effluent volume - 300 ml, dry resin - 5 g | 100 | 75 | 60 |
| Anionite Purolite A-400, 40 C: | | | |
| Anionate capacity (mmole $KClO_4/g$) at sorption (rate 2 ml/min) | 1.33 | 1.31 | 1.32 |
| Desorption degree (%) at the rate of 1 ml/min, Column effluent volume 150 ml, dry resin - 5 g | 100 | 100 | 95 |

What is claimed is:

1. A method for extracting perchlorate-ion from an aqueous solution, comprising:
   passing the aqueous solution through a highly basic anionite in the nitrate form; and
   subsequently regenerating the anionite in an aqueous solution of a nitrate of an alkali or alkaline-earth metal at a regeneration temperature of 0-60° C.

2. The method as defined in claim 1, further comprising washing the anionite in the nitrate form with water after regenerating, wherein the water can be subsequently reused.

3. The method as defined in claim 1, comprising obtaining the anionite in the nitrate form by standing of a highly basic anionite in the chloride form in an aqueous solution of a nitrate of an alkali metal.

4. The method as defined in claim 1, comprising obtaining the anionite in the nitrate form by standing a highly basic anionite in the basic (OH—) form in an aqueous solution of a nitrate of an alkali metal.

5. The method as defined in claim 1, wherein potassium nitrate is used as the nitrate of the alkali metal.

6. The method as defined in claim 1, wherein sodium nitrate is used as the nitrate of the alkali metal.

7. The method as defined in claim 1, wherein magnesium nitrate is used as the nitrate of the alkali metal.

8. The method as defined in claim 1, wherein regenerating the anionite in the nitrate form is performed at a temperature between 0° C. and 45° C.

9. The method as defined in claim 1, wherein regenerating the anionite in the nitrate form is performed in the aqueous solution of the alkali or the alkaline-earth metal nitrate having a concentration from 1 weight % to a saturation concentration at the regeneration temperature.

\* \* \* \* \*